United States Patent [19]
Mariani

[11] 3,714,923
[45] Feb. 6, 1973

[54] DEPTH MARKER FOR A FISH LINE

[76] Inventor: Louis J. Mariani, 605 Center Street, Jessup, Pa. 18434

[22] Filed: April 12, 1971

[21] Appl. No.: 133,177

[52] U.S. Cl. ...................... 116/114, 24/129 B, 43/17
[51] Int. Cl. ............................................... G01d 21/00
[58] Field of Search ......... 116/114; 24/129 R, 129 B; 33/126.5; 43/17, 43.1, 43.11, 44.87, 44.85

[56] References Cited

UNITED STATES PATENTS

| | | | |
|---|---|---|---|
| 278,097 | 5/1883 | Collins | 24/129 B |
| 510,205 | 12/1893 | Stiner | 43/17 |
| 1,406,038 | 2/1922 | Larsen et al. | 43/17 |
| 2,229,935 | 1/1941 | Powers | 24/129 B |
| 2,533,341 | 12/1950 | Alfano | 24/129 R |
| 2,786,294 | 3/1957 | Whitacre | 43/17 |

*Primary Examiner*—Louis J. Capozi
*Attorney*—Spencer & Kaye

[57] ABSTRACT

A depth marker has a plurality of wedge-shaped openings or notches extending inward from opposite side edges of the marker and the notches on one side are offset relative to those on the other side. The marker can be releasably secured to a line by winding the line back and forth alternately from side to side to engage in the notches and overlying the front and back faces of the marker.

1 Claim, 3 Drawing Figures

PATENTED JAN 6 1973
3,714,923
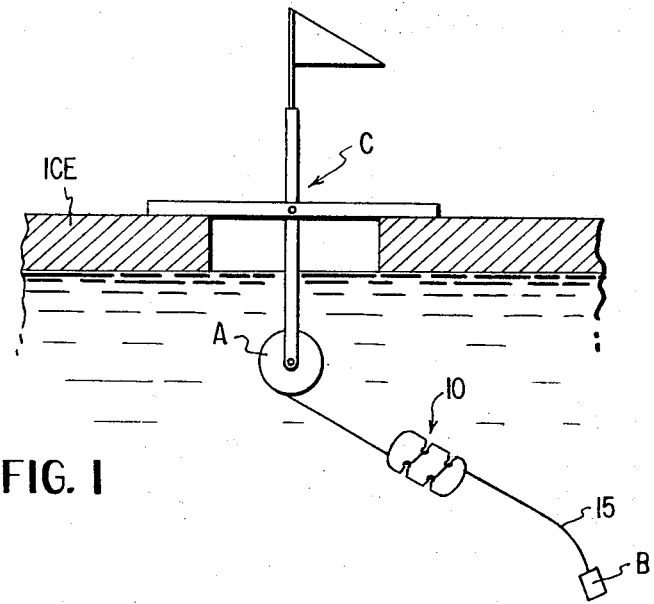
FIG. 1
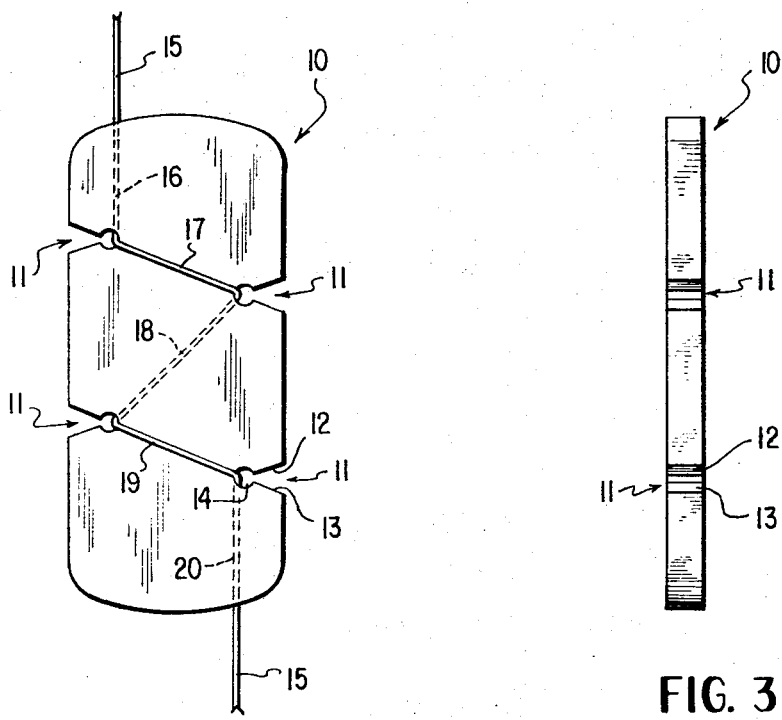
FIG. 2
FIG. 3
INVENTOR
Louis J. Mariani
BY *Spencer & Kaye*
ATTORNEYS.

3,714,923

DEPTH MARKER FOR A FISH LINE

BACKGROUND OF THE INVENTION

The present invention relates to a marker which can be releasably secured to a line and particularly to a marker indicating the depth of a fishing lure in the water.

In order for a fisherman to know desirable depths for the lure he uses on a fishing line, it is necessary for him to have some way of knowing how far the line extends into the water and particularly when fishing through a hole in ice. Various types of markers have been used on fishing lines in the past for this purpose. However, such markers have to be threaded onto the line or crimped in some manner to a desired position on the line. This, of course, is a tedious process, and involves an appreciable amount of time when it is desired to move the marker from one location to another on the fishing line.

SUMMARY OF THE INVENTION

It is an object of the invention to provide a marker for use on a fishing line which can be quickly and easily secured to the line at a desired position.

It is a further object of the invention to provide means whereby the marker can be attached to the line by looping the line around the marker so that no threading or crimping of the marker on the line is required.

It is still another object to provide a marker which can be readily seen on a line used in ice fishing.

These objects and others are accomplished with a marker which includes a generally flat piece of material, such as a plastic, which is easily seen and yet has a certain amount of rigidity to bear the strains placed on the line. The piece of material generally may be varied as desired.

In order to provide means for releasably securing a fish line to this marker, a plurality of generally wedge-shaped openings or notches are provided to extend inwardly along opposite side edges of the marker. The fishing line is threaded alternately back and forth to be releasably confined in these notches with part of the line lying against one face of the marker while the other part of the line lies on the back face of the marker.

BRIEF DESCRIPTION OF THE DRAWINGS

FIG. 1 shows how the invention is used on a line during ice fishing.

FIG. 2 is a front elevational view of a marker showing the fishing line as wound thereon.

FIG. 3 is a side elevational view of the marker shown in FIG. 1 but without the fish line wound thereon.

DESCRIPTION OF THE PREFERRED EMBODIMENT

Referring first to FIG. 1, it will be seen that, as is customary in ice fishing, a reel A with line 15 and lure or bait B are supported in the water beneath the ice by support means, generally indicated at C, which is placed at and over a hole in the ice. As the support means, the reel and the lure provide no part of the invention, they will not be described but known products can be used.

It will be understood that when a desirable depth for fishing is established, the marker 10 according to the invention can be placed on the line 15 closely adjacent reel A, say for example 2-3 inches away. If a fish is caught or the bait must be replenished, the equipment is lifted out of the water through the hole and the line can be pulled in by hand. Obviously, unless the line 15 is marked in some manner, it will not be possible to tell how much line should be provided between the reel and the lure B when the line is returned to the water.

The marker 10 can be a relatively flat plate member with extended side edges. Along the side edges there are inwardly directed wedge-shaped openings, generally indicated by the reference numeral 11. As best seen in FIG. 2, the inwardly directed wedge-shaped openings on one side edge of the marker 10 are longitudinally offset from corresponding wedge-shaped openings on the other side edge of the marker 10. Each of these inwardly directed wedge-shaped openings 11 is of the same configuration with inwardly converging wall portions 12 and 13 terminating in a restricted throat that opens into a larger hole 14 in the material. This throat portion is desirably of about the same width as (or possibly slightly smaller than) the diameter of the fishing line 15.

The manner of securement of the marker 10 to a line 15 is best seen in FIG. 2. As shown there, the line 15 has been alternately wound back and forth to be guided by the wedge-shaped openings into the holes 14 on opposite sides of the marker 10. As thus wound, a portion 16, a portion 18 and a portion 20 of line 15 lie on a back face of the marker while portions 17 and 19 lie on the front face of the marker.

It will be understood that the line 15 is gently forced through the throat openings into the holes 14 at either side of the marker as the line 15 is alternately wound back and forth on the marker. When the line 15 is received in the holes 14 of the wedge-shaped opening 11, the marker will be firmly held on the line 15. At the same time, the throat portion prevents the unintentional disengagement of line 15 from the holes. However, if it is desired to change the position of the marker 10 on line 15, the marker 10 can be held and with slight pressure applied to the line, the line can be moved from a hole 14 through the throat and out through the wedge-shaped opening 11 as the line is progressively unwound from engagement with the marker.

It will be understood that the above description of the present invention is susceptible to various modifications, changes and adaptations and the same are intended to be comprehended within the meaning and range of equivalents of the appended claims.

I claim:

1. A marker which can be releasably secured on a continuous length of a fish line intermediate the ends thereof, comprising a generally rectangularly-shaped flat piece with only four openings through said piece, two of said openings extending inwardly from each one of the two generally opposite longitudinally extending side edges of said piece for receiving a portion of the length of the line, each of said openings having inwardly converging sidewalls which terminate at a throat opening into a slightly larger hole, said sidewalls of each of said openings being disposed with respect to associated side edges of said piece so that said sidewalls are symmetrical about a plane extending through the mid-point of the associated larger hole and normal to the associated longitudinally extending side edges of said piece, the openings on one side of said piece being longitudinally offset with respect to the openings on the other side, and with the slightly larger holes of the openings on one side being longitudinally aligned and transversely offset with the respect to the holes on the other side, whereby the portion of the fish line can be looped back and forth around the piece and forced through the throat openings into the slightly larger holes of each of the openings on respective side edges of said flat piece, the portion of the fish line secured to the marker lying flat against the front and back faces of said flat piece with terminal sections of the portion of the line disposed along one of the faces but displaced on opposite sides of the longitudinal center line of said piece and with the section of the line intermediate the terminal sections being disposed in a zig-zag manner between the holes of the openings of said piece to form a Z-shaped section of line, and the end arms of this Z-shaped section of line lie against the other of the faces of said flat piece and the connecting arm between these end arms lies against the one of the faces, so that the plate member is retained on the line at a desired location.

* * * * *